Jan. 22, 1957  A. NYMAN  2,778,873
OPTICAL SCANNING APPARATUS
Filed May 19, 1951  5 Sheets-Sheet 1

Inventor
Alexander Nyman
by Roberts, Cushman & Grover
att'ys.

Jan. 22, 1957   A. NYMAN   2,778,873
OPTICAL SCANNING APPARATUS
Filed May 19, 1951   5 Sheets-Sheet 3

Inventor
Alexander Nyman
by Roberts, Cushman & Grover
att'ys.

Inventor
Alexander Nyman
by Roberts, Cushman & Grover
att'ys.

Jan. 22, 1957 A. NYMAN 2,778,873
OPTICAL SCANNING APPARATUS
Filed May 19, 1951 5 Sheets—Sheet 5
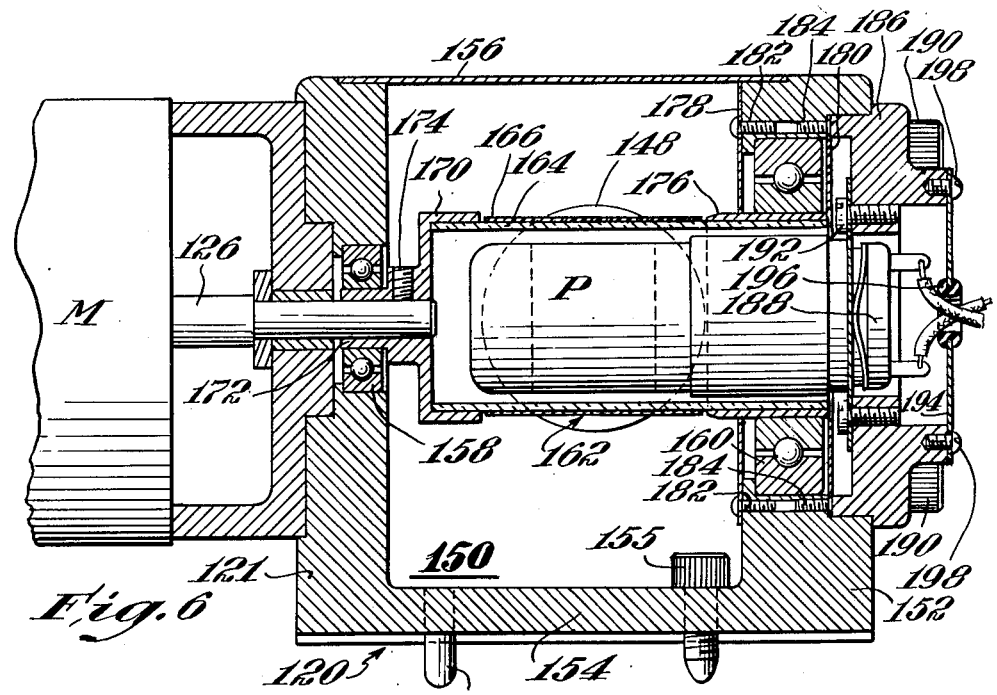
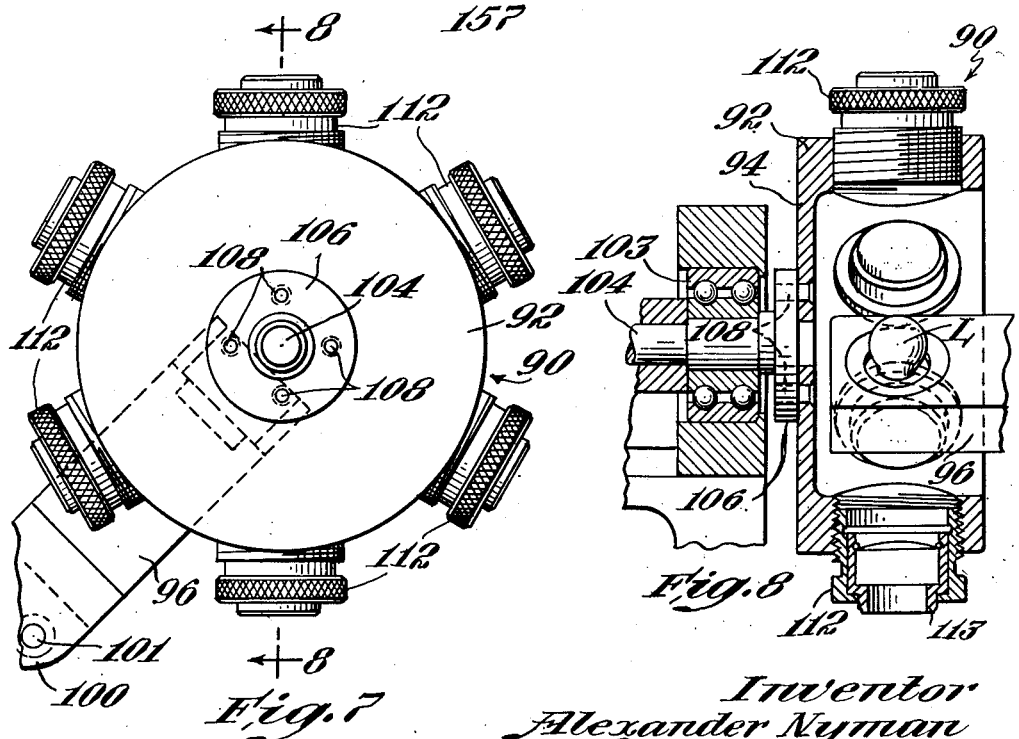
Inventor
Alexander Nyman
by Roberts, Cushman & Grover
attys.

United States Patent Office 2,778,873
Patented Jan. 22, 1957

2,778,873

OPTICAL SCANNING APPARATUS

Alexander Nyman, Dover, Mass., assignor to Alden Products Co., Brockton, Mass., a corporation of Massachusetts Application May 19, 1951, Serial No. 227,144

19 Claims. (Cl. 178—7.1)

In conventional optical scanning apparatus, such as transmitters commonly used for facsimile and copy work, the subject copy is secured to the periphery of a rotating drum and scanned by a photoelectric cell which is moved axially relatively to the drum. This arrangement is very satisfactory for many applications but is subject to several inherent disadvantages including the necessity of stopping the drum to change the copy so that the transmission cannot be continuous. Furthermore the copy must be able to conform to the surface of the drum thus making it impractical to scan nonflexible material such as bound books.

Objects of this invention are to provide an optical scanner which will scan flat copy, which does not require that the copy be deformed, which is continuous in operation, which does not require relative movement of the photocell transversely of the direction of feed of the copy, which does not require an elaborate optical system, which is not limited as to the length of copy scanned, and which advances the facsimile art generally.

In a broad aspect the invention contemplates illuminating of selected transverse linear elements of the subject copy and sequential scanning each transverse element by means of a helical aperture rotating about the axis of the helix. The width of the illuminated element is limited, for example by a converging lens system or a suitable aperture so that its width is equal to the width of the elemental scanning area, i. e., the "scanning spot." The varying intensity of light derived from this scanning spot impinges upon a light sensitive device, such as a photoelectric cell, for transforming the variations in light intensity into an electrical signal. The other dimension of the elemental scanning area lying in the longitudinal direction of the linear copy element, which hereinafter will be designated as the "length" of the area, is defined by means of the rotation of the helical aperture which is preferably interposed in the path of the light rays coming (either by reflection or transmission) from the copy to impinge upon the light sensitive device. It will be evident that by causing relative movement of the copy, linear elements of the copy can be successively illuminated so that the elemental scanning area scans the copy either with a sequential or interlaced pattern.

In the above described method of scanning it is important that the intensity of the illumination be maintained constant throughout the length of the transverse linear elements which introduces serious mechanical and electrical problems if the elemental line to be scanned is relatively long. As only a very small part of the total illumination is used at any instant, a system which is much more economical in the use of light, results if only the portion of the elemental line which is being scanned at any particular instant is illuminated, for example by moving a light spot, which is elongate or somewhat greater in length than the length of the elemental scanned area along the line being scanned, in synchronism with the scanning rate as determined by the rotational speed of the helical aperture. The need for the light economy is based on the fact that such light must be steady as ordinary light from a 60 cycle power source has too much flicker, therefore either a special high frequency source or a special D. C. source must be used to avoid such flicker if more than a small spot is illuminated.

In another aspect the invention contemplates optical apparatus for scanning a subject copy comprising illuminating means for projecting one or more spots of light sequentially upon the copy which spots are moved transversely to the direction relatively to which the copy is fed. An optical system is provided for directing the light rays coming (either by reflection or transmission) from the portion of the copy illuminated by the spots to impinge upon a light sensitive device, such as a photocell, which is electrically responsive to variations in light intensity. A helically shaped aperture is interposed in the optical path of the light rays between the copy and the light sensitive device. The aperture is preferably defined by means of a drum shaped structure, the light transmitting portion being formed for example by a slot through the drum structure wall, or by a helical strip of light transmitting material on either side of which is disposed opaque material. Driving means such as an electric motor is used to rotate the helical aperture about its axis. The transverse movement of light spots across the copy is synchronized with the rotation of the light spots either by using the same motor to drive both the illuminating means and the drum structure or by the use of separate driving motors which are electrically synchronized.

In a more specific aspect the illuminating means for the copy includes a rotatable turret which is provided with a plurality of equally spaced, radially disposed converging lens systems about its periphery. A light source, such as an electric lamp, is arranged, either by mounting it within the turret with its light rays producing portion such as the filament or arc coinciding with the axis of rotation of the turret, or by mounting the lamp outside the turret and using a suitable optical system to introduce the light rays at the turret axis so that in either case the light rays from the source are projected by the respective lens system as a plurality of spots of light. A cylindrical lens is interposed between the lens systems and the copy to better define the width of the spots projected upon the copy. The turret is positioned with respect to the copy so that rotation of the turret sequentially projects the respective spots of light upon successive transverse elements of the copy in a lengthwise direction transverse to the direction in which the copy is fed.

In another specific aspect a common driving motor for both the turret and aperture drum is directly coupled to the drum so that the helical aperture is rotated about its axis at the same speed as the motor. The turret is driven in synchronism with the drum by means of a speed reduction gear unit. The gear reduction ratio of unit is correlated to the number of lens systems extending from the turret so that a light spot scans the copy each time the helical aperture makes one revolution.

In another specific aspect the path along which the copy is fed is determined by a copy table wherein is provided a slotted aperture whose longitudinal dimension is transverse to the direction of copy feed. One or more feed rolls, which are preferably arranged in pairs on either side of the slotted aperture, are used to move the copy. The feed rolls are preferably operated by an electric motor other than the motor driving the turret and drum, it not being necessary that the speed of the motors be correlated in any particular manner.

These and other objects and aspects will be apparent from the following description of a specific embodiment of the invention referring to drawings wherein:

Fig. 6 is an enlarged fragmentary view in section showing the details of the aperture drum;

Fig. 7 is an end view of the lens turret;

Fig. 8 is a sectional view on line 8—8 of Fig. 7; and

Figure 1:
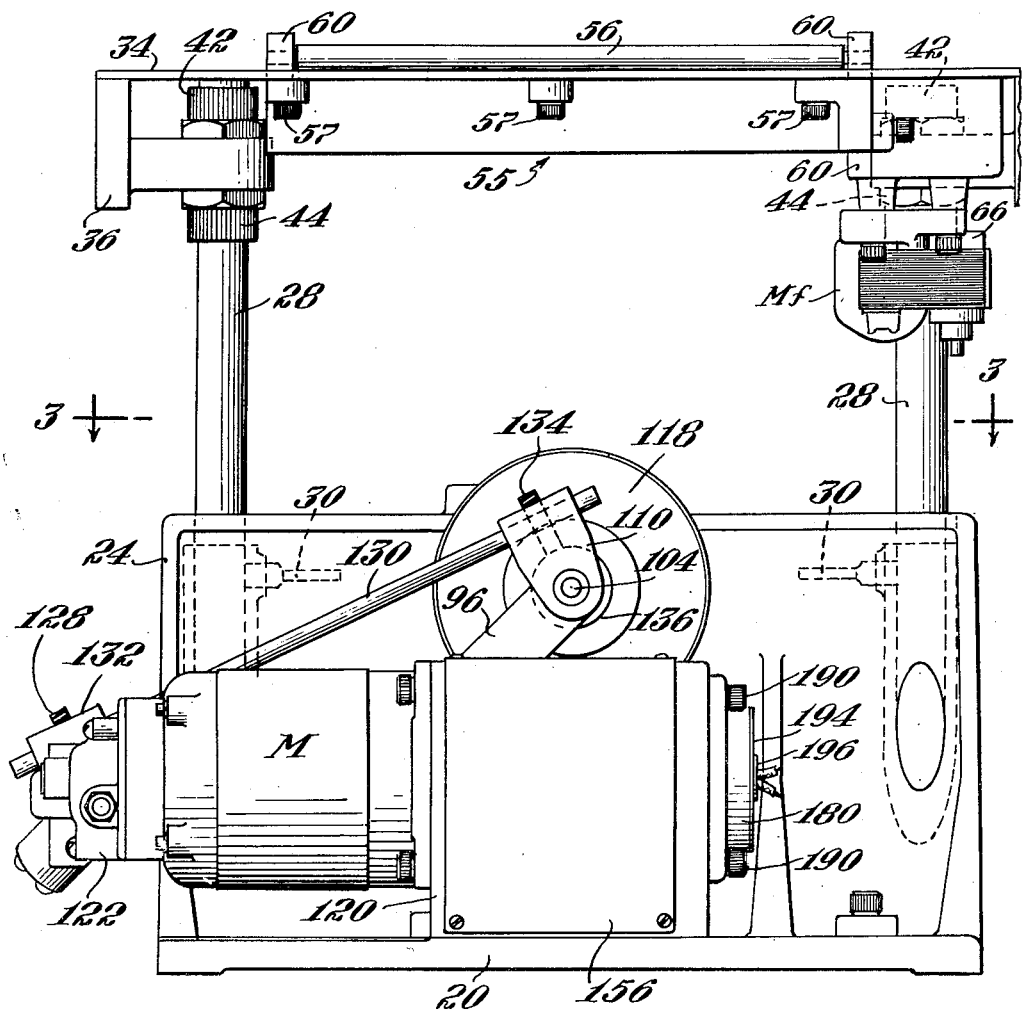
Fig. 1 is a front elevation view.
Figure 2:
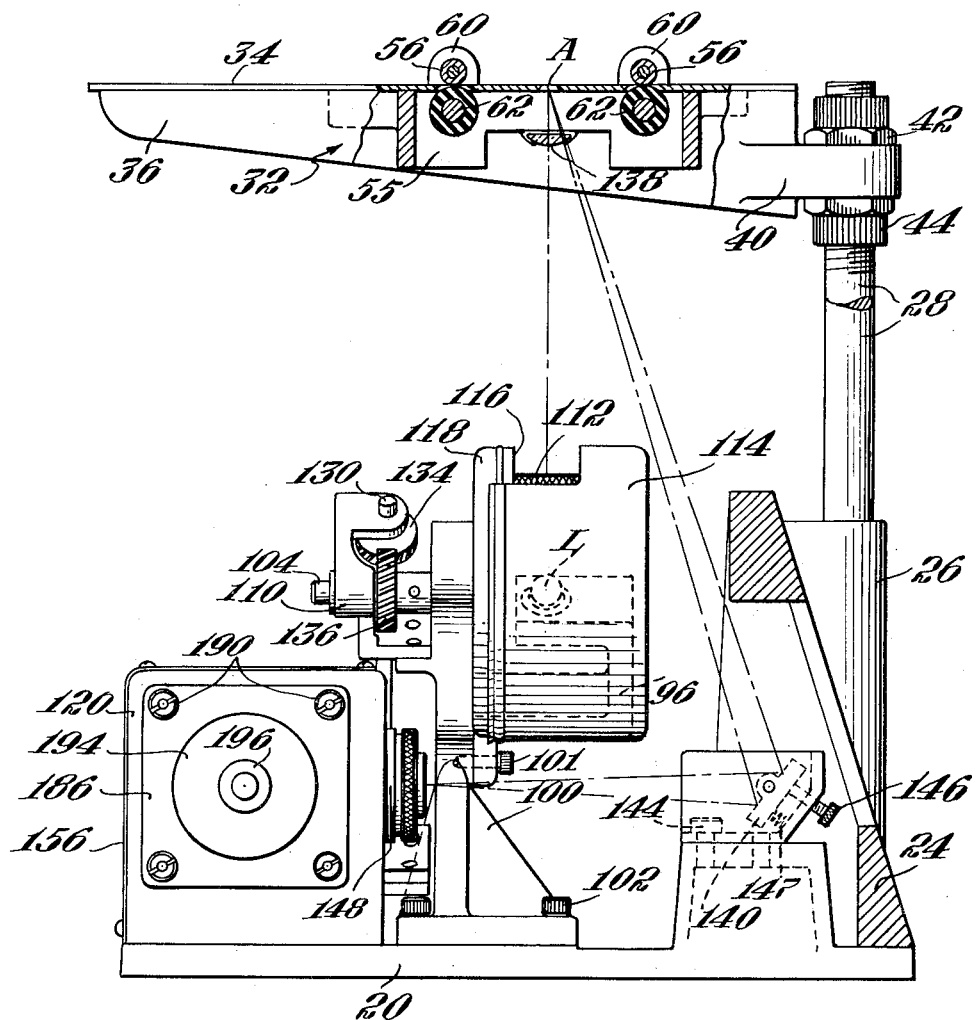
Fig. 2 is a side elevation view partially in section.

As is best shown in Figs. 1 and 2 the embodiment of an optical scanner chosen for the purposes of illustration is supported upon a base 20 having a bracket 24 cast integrally therewith so that the bracket extends upwardly from the rear of the base. The bracket 24 has bosses 26 positioned at either end thereof wherein are carried two vertically disposed columns 28 which telescope respectively in apertures in the bosses being secured in adjusted position by means of thumb screws 30.

Upon the upper ends of the columns 28 is carried a copy table 32 having an upper copy guiding surface 34, each side of which is reinforced by a respective rib 36 being attached thereto by means of screws 38. At the rear end of each rib 36 is an integrally cast finger or tab 40 which is turned inwardly and provided with an aperture for engaging the upper end of a respective column 28. The table 32 is held in position by two pairs of nuts 42 and 44 which engage threads cut in the ends of the columns 28 so that nuts are positioned respectively above and below the tabs 40. The surface 34 of the copy table is provided with three transverse slots, the center slot A of which forms an elongated opening whose function will be described in detail hereinafter.

Figure 5:
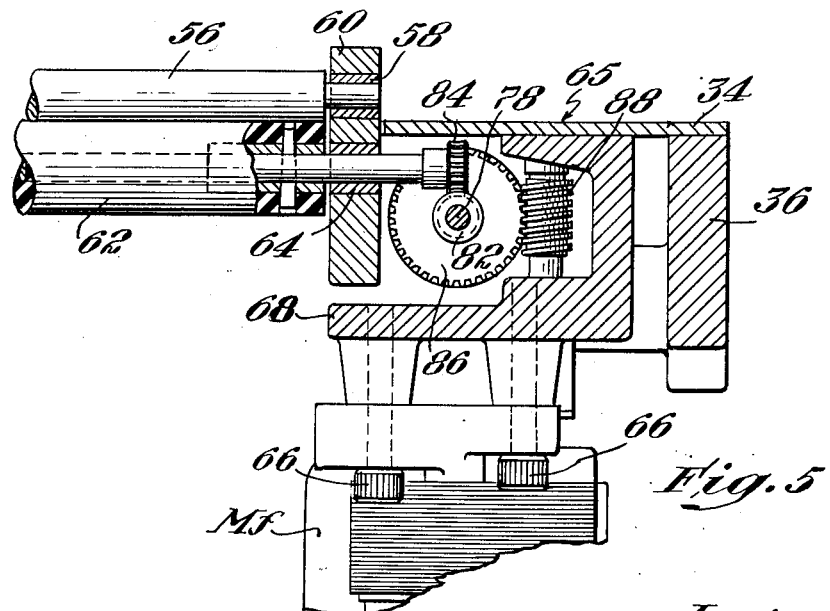
Fig. 5 is a partial section view enlarged to show the details of the gear reduction unit.

The subject copy is fed over the top 34 of the table by means of two pairs of feed rolls which are located in the outer slots in the table on either side of the opening A. The feed rolls are supported in a frame 55 which is suspended beneath the table 32 by means of knurled screws 57. The driven roll 56 of each pair is carried upon a shaft which is journaled in bearings 58 as is shown in Fig. 5. Each bearing 58 is pressed into an aperture in a respective boss 60 which projects upwardly through the slotted apertures in the table from the side members of the frame 55. The shaft of the driving roll 62 of each pair is journaled in bearings 64 pressed in apertures in the opposed frame side members immediately below the bosses 60.

Figure 4:
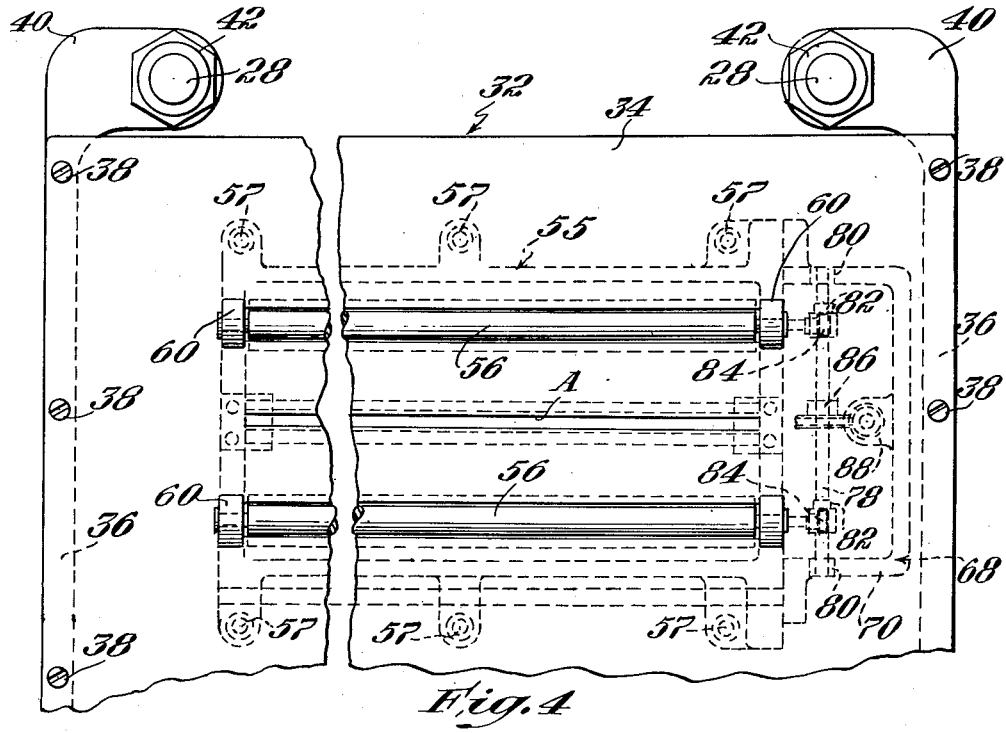
Fig. 4 is a partial plan view of the copy table showing the feed rolls.

Both pair of feed rolls are driven at the same speed by means of an electric motor M$f$ which is suspended from the bottom of a housing 68 of a reduction gear unit 65 (Fig. 5) by means of knurled screws 66. The gear reduction unit 65 comprises a shaft 78 whose ends are journaled in bearings 80 (Fig. 4) pressed in the housing ends 70. The shaft 78 carries two worms 82 which engage gears 84 carried on the ends of the respective shafts of the lower feed rolls 62. Interposed between the worms 82 is a driving gear 86 which mates with a worm gear 88 carried upon the shaft of the motor M$f$ between the U-shaped portion of the gear reduction unit housing 68.

Depending upon the direction of rotation of drive rolls the one that engages the leading edge of the copy is made with a slightly larger diameter. Its peripheral speed is therefore slightly in excess of the speed of the second roll engaging the following part of the copy. Tension is thereby exercised on the copy to maintain it in flat condition.

As the subject copy is moved by the opening A by the above described feed rolls, successive transverse linear elements of the surface of the copy adjacent the table surface 34 are exposed by the center slot A to a light ray from illuminating means which include an incandescent lamp L (Fig. 8) whose filament is positioned upon the axis of rotation of a lens turret 90. As is best shown in Figs. 7 and 8, the turret comprises a hollow drum 92 one end of which is closed by an integrally formed head 94. The opposite end of the drum 92 is open so as not to interfere with a U-shaped arm 96 (see Fig. 2 also) one end of which holds the socket for the lamp L.

The opposite flange end of the arm 96 is fastened to the face of a bracket 100 by screws 101. The bottom flange of the bracket 100 is in turn attached to the base 20 by means of four cap screws 102. The bracket 100 also carries a double ball bearing 103 (Fig. 8) into which is journaled one end of the horizontal shaft 104 having a flange 106 which is screwed to the drum head 94 by means of four equally spaced flat headed screws 108. The other end of the shaft 104 is journaled in a hanger 110 (Figs. 2 and 3) bolted to the opposite face of the bracket from the arm 96. The hanger 110 also has a U-shaped portion for supporting elements of a reduction gear drive for the turret 90 as will be described in detail hereinafter.

About the periphery of the turret drum 92 are disposed six equally spaced apertures in which are threaded respectively the barrels of similar lens systems designated generally as 112 (see Figs. 7 and 8). The lens systems 112 are of conventional optical design. The lens barrel 113 is designed to have its outer surface slightly eccentric with respect to the inner or lens supporting surface. Slight irregularities in the location of the optical axis of the lenses can be therefore corrected by turning this barrel 113 within its housing 112. Such adjustment assures that the sequential illuminated lines on the copy to be scanned are following over exactly the same path or, if an interlaced scanning pattern is preferred that the lines are suitably staggered to achieve such pattern.

The turret 90 is positioned with respect to the slotted opening A in the copy table 32 so that the light beam from the lens system 112 positioned at any particular time at the top of the turret impinges upon one of the linear transverse elements of the subject copy exposed by the slot A. The position of the filament of lamp L is oriented so that the image of this filament projected on the copy is in line with the elemental scanning direction and the focal distance is chosen so that the thickness of the image of the filament corresponds approximately to the width of elemental scanning area. The other spot dimension (i. e. its length) is greater than the length of the elemental scanning area, the exact length not being critical for reasons which will be discussed in detail hereinafter. The axis of rotation of the turret 90 is arranged at right angles to the slot A so that as the turret is rotated, the spot of light sweeps lengthwise of the slot along a transverse element of the copy.

To prevent extraneous light from the other lens systems 112 and the open end of the drum 92 from reaching the copy, a cylindrical shield 114 having a recess 116 through which the light beam from the top lens system 112 can project, is positioned encircling the turret 90. As is best shown in Fig. 2 the shield 114 is held in position by means of a groove near its open end which snaps over a corresponding bead on the cover 118 which is attached to the bracket 100.

The turret 90 is rotated by means of a motor M which is supported at one end by a rabbet in the side wall 121 (Fig. 6) of a housing 120 whose principal function will be described in detail below. At the opposite end of the motor M is incorporated a conventional right angle drive 122 (Fig. 3) which brings out the motor takeoff shaft 124 normally to the axis of the motor armature shaft 126 (Fig. 6). Fastened to the end of the takeoff shaft 124 (Fig. 3) is a helical gear 126 engaging a mating gear 128 which is pinned to the end of a drive shaft 130. A bracket 132 is secured to the end of the housing for the right angle drive 122 and is provided with two arms one located on either side of the gear 128 which arms carry the bearings wherein the lower end of the shaft 130 is journaled.

The opposite end of the shaft 130 which has pinned thereto a helical gear 134 is similarly journaled in arms forming the U-shaped portion of the hanger 110 mentioned heretofore. The gear 134 engages a mating gear 136 secured to the turret shaft 104 as is shown in Fig. 2. The above described gears are so chosen that the speed reduction between the motor shaft 126 and the turret shaft 104 is equal to the number of lens systems 112 carried by the turret, i. e. 6, so that for each revolution of the motor shaft 126 a spot of light sweeps across the copy adjacent the opening A.

Suspended from the copy table 32 immediately below the slotted opening A is a cylindrical lens 138 so that the successive beams of light from the lens systems 112 are further converged and the width of the spots transverse to their direction of travel is definitely defined. As each successive light spot moves across the copy, the image thereof is reflected by a stationary mirror 140 (Fig. 2) pivotally mounted in a bracket 142 which is attached to the base 20 by means of cap screws 144. The relative position of the mirror is adjustable by means of an adjustment screw 146, which operates against the biasing force exerted by a spring 147 so that the light rays from the spot are directed through a converging lens system 148 mounted in the back wall of the housing 120.

The details of construction of the housing 120 and the manner in which a light sensitive device such as the phototube P is mounted therein are best shown in Fig. 6. The rear wall 150 wherein is mounted the barrel of the lens system 148, the side wall 121 supporting the motor M as mentioned above, the opposite side wall 152 and the bottom portion 154 of the housing 120 are cast integrally at right angles to one another thereby to form a substantially cubical structure having an open top and front wall which can be closed by a cover plate 156 to exclude any light. The housing 120 is attached to the base 20 by means of cap screws 155 which extend through the bottom portion 154, the housing position being definitely established by two dowels 157.

Figure 3:
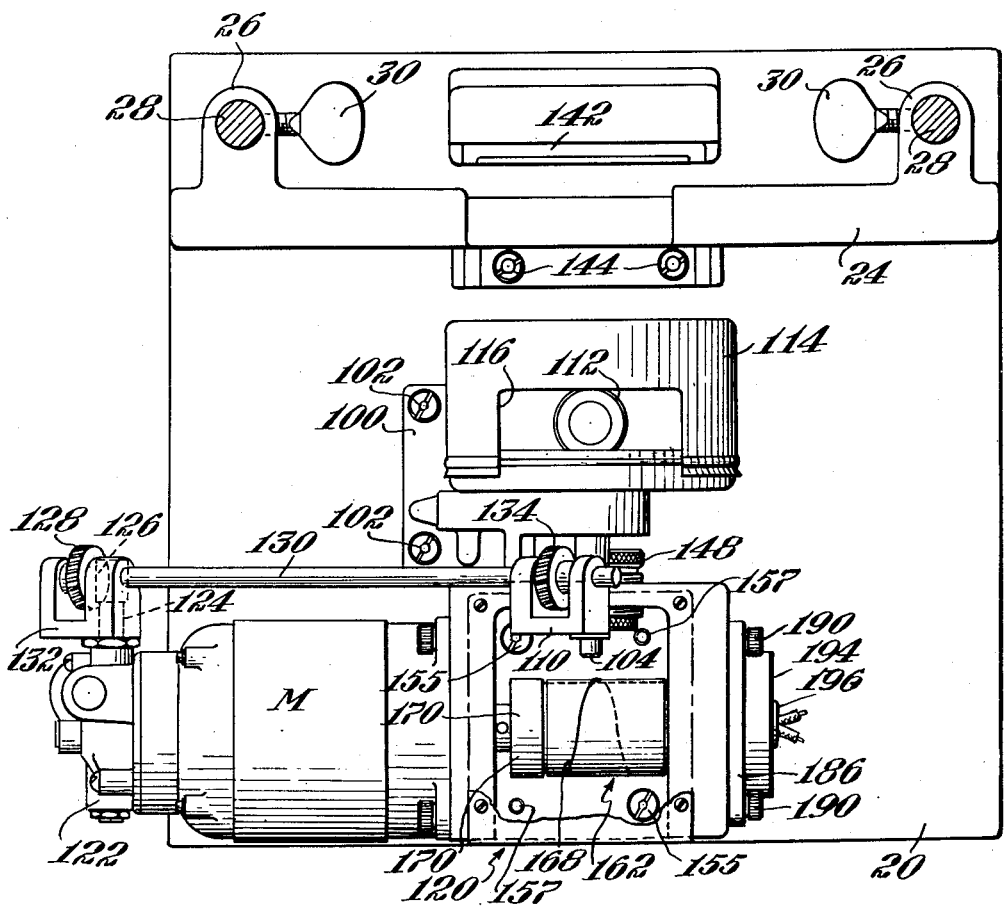
Fig. 3 is a sectional view on line 3—3 of Fig. 1.

The walls 121 and 154 are provided with axially aligned apertures wherein are seated respectively two ball bearings 158 and 160 (Fig. 6) which journal an aperture drum 162. This drum comprises a cylinder 164 of transparent material such as glass or a suitable plastic. Cemented or otherwise secured to the outer periphery of the drum 162 is a sheet 166 of opaque material such as an exposed photographic film whereupon there has been developed a light transmitting helical aperture 168 (Fig. 3). One end of the cylinder 162 is closed by a head 170 having a stub shaft 172 which engages the inner race of the bearing 158. The shaft 172 is provided with an aperture for receiving the end of the motor shaft 126, relative rotation between the shafts being prevented by a set screw 174. The opposite end of the cylinder 162 is surrounded by ferrule 176 which engages the inner race of the bearing 160. On either side of the bearing 160 are provided shields such as 178 and 180 which are held in place by screws 182 and 184 respectively.

The phototube P is mounted within the drum 162 so that it can be removed without disturbing the drum assembly or bearings. To this end an end plate 186 carrying a socket 188 for the phototube P engages a rabbet cut in the housing side wall 152 being secured therein by screws 190. The socket 188 is secured in an aperture in the end plate 186 by means of screws 192, the aperture being closed by a cover 194 having a grommet 196 therein out through which are brought the leads coming from the socket 188. The cover 194 is attached to the end plate 186 by means of screws 198.

The operation of the above described scanning apparatus is essentially very simple. The subject copy is placed upon the top of the table 32 and inserted so that it is fed between two pairs of rolls 56 and 62 with the surface to be scanned lying upon the table surface 34. Upon energization the motor Mf conjointly operates both pair of feed rolls, as described heretofore, so that the copy moves by the slotted opening A in the table surface 34. As the turret 90 is rotated, the beam of light from the uppermost lens systems 112 sweeps transversely of one of the linear element of the copy exposed through the slot.

Figure 9:
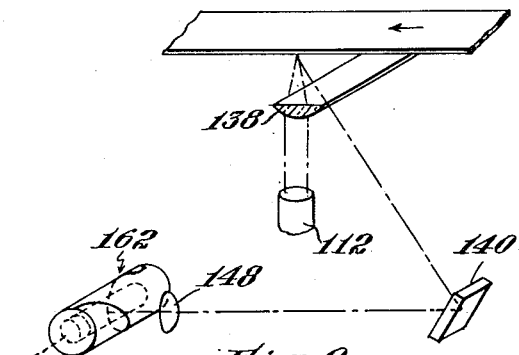
Fig. 9 is a schematic diagram of the optical system.

As is best shown in Fig. 9 light rays reflected from the illuminated line are imaged by the stationary mirror 140 through the lens system 148 into the interior of the phototube housing 120, and are focused on the surface of the aperture drum 126 which is positioned immediately behind the lens system. The image of the line upon the surface of the drum is in a horizontal plane through the axis of rotation of the drum. It will be evident that if the rotational phase and speed relationship between the drum 126 and the turret 162 are properly correlated, a portion of the light transmitting helical aperture 168 is always in a position to transmit the light rays through the drum as the impinging rays reflected from the spot move axially of the drum. By proper proportioning of the lateral dimension of the aperture and the angle of advance of the helix the light rays passing through the drum 126 are limited to define the spot impinging upon the photoelectric cell P so that the length thereof is equal to the length of the selected elemental scanning area.

The rate at which the copy is fed by the slot A is correlated with the width of the spot of light, as determined by the cylindrical lens 138, and the rotational speed of the turret 90 so that sequential linear transverse elements of the copy are illuminated by spots of light from the lens systems 112 thereby effectively to scan the copy.

It should be understood that the present disclosure is for the purpose of illumination only and that this invention includes all modifications and equivalents which fall within the scope of the appended claims.

I claim:

1. Optical scanning apparatus for a subject copy comprising feeding means for moving the copy relatively to a predetermined path, illuminating means for projecting a spot of light upon said copy including means for moving said spot transversely to the direction of movement of the copy, a light sensitive device responsive to variations in light intensity, an optical system for directing light rays coming from the portion of the copy illuminated by the spot to impinge upon said light sensitive device, said system including an aperture member having a helically shaped light transmitting portion interposed in the optical path of said light rays between the copy and the light sensitive device, means for rotating the aperture member about the axis of the helix, and a connection between said moving means and said rotating means for synchronizing movement of both of said means so that selected elements of the copy are successively imaged on the device.

2. Optical scanning apparatus for a subject copy comprising feeding means for moving the copy relatively to a predetermined path, illuminating means for projecting a spot of light upon said copy including means for moving said spot transversely to the direction of movement of the copy, a light sensitive device responsive to variations in light intensity, an optical system for directing light rays reflected from the portion of the copy illuminated by the spot to impinge upon said light sensitive device, said system including an aperture member having a helically shaped aperture interposed in the optical path of said light rays between the copy and the light sensitive device, means for rotating the aperture member about the axis of the helix, and a connection between said moving means and said rotating means for synchronizing movement of both of said means so that selected elements of the copy are successively imaged on the device.

3. Optical scanning apparatus for a subject copy comprising feeding means for moving the copy relatively to a predetermined path, illuminating means for sequentially projecting respective spots of light upon successive transverse elements of the copy as it is moved by the feeding means including means for moving said spots lengthwise of the respective transverse elements of the copy, a light sensitive device responsive to variations in light intensity, an optical system for directing light rays coming from the portion of the copy illuminated by the spots to impinge upon said light sensitive device, said system including an aperture member having a helically shaped aperture interposed in the optical path of said light rays between the copy and the light sensitive device, means for rotating the aperture member about the axis of the helix, and a connection between said moving means and rotating means for synchronizing movement of both of said means so that selected elements of the copy are successively imaged on the device.

4. Optical scanning apparatus for a subject copy comprising feeding means for moving the copy relatively to a predetermined path, illuminating means including a turret having one or more lens systems, moving means for rotating the turret sequentially to project respective spots of light upon successive transverse elements of the copy as it is moved by the feeding means, said spots being moved lengthwise of the respective transverse elements of the copy, a light sensitive device responsive to variations in light intensity, an optical system for directing light rays coming from the portion of the copy illuminated by the spots to impinge upon said light sensitive device, a drum having a helically shaped aperture interposed in the optical path of said light rays between the copy and the light sensitive device, and a connection between said moving means and rotating means for synchronizing movement of both of said means so that selected elements of the copy are successively imaged on the device.

5. Optical scanning apparatus for a subject copy comprising feeding means for moving the copy relatively to a predetermined path, a rotatable turret having a plurality of equally spaced, radially disposed lens systems, a light source arranged so that its rays are projected by the lens systems as a plurality of spots of light, moving means for rotating the turret sequentially to project respective spots of light upon successive transverse elements of the copy as it is moved by the feeding means, said spots being moved lengthwise of the respective transverse elements of the copy, a light sensitive device responsive to variations in light intensity, an optical system for directing light rays reflected from the portion of the copy illuminated by the spots to impinge upon said light sensitive device, said system including a helically shaped aperture interposed in the optical path of said light rays between the copy and the light sensitive device, means for rotating the aperture about the axis of the helix, and a connection between said moving means and rotating means for synchronizing movement of both of said means so that selected elements of the copy are successively imaged on the device.

6. Optical scanning apparatus for a subject copy comprising feeding means for moving the copy relatively to a predetermined path, illuminating means including a rotatable turret having a plurality of lens systems for sequentially projecting respective spots of light upon successive transverse elements of the copy as it is moved by the feeding means, said spots being moved lengthwise of the respective transverse elements of the copy, a light sensitive device responsive to variations in light intensity, an optical system for directing light rays reflected from the portion of the copy illuminated by the spots to impinge upon said light sensitive device, a drum having a helically shaped aperture enclosing said light sensitive device so that the aperture is interposed in the optical path of said light rays between the copy and the light sensitive device, a driving motor for rotating the drum about the axis of the helix, and means connecting said driving motor and the turret for conjointly rotating the turret in synchronism with the rotation of the drum so that selected elements of the copy are successively imaged on the device.

7. Optical scanning apparatus for a subject copy comprising feeding means for moving the copy relatively to a predetermined path, illuminating means including a rotatable turret having a plurality of lens systems for sequentially projecting respective spots of light upon successive transverse elements of the copy as it is moved by the feeding means, said spots being moved lengthwise of the respective transverse elements of the copy, a light sensitive device responsive to variations in light intensity, an optical system for directing light rays reflected from the portion of the copy illuminated by the spots to impinge upon said light sensitive device, a drum having a helically shaped aperture enclosing said light sensitive device so that the aperture is interposed in the optical path of said light rays between the copy and the light sensitive device, a driving motor directly connected to said drum for rotating the drum about the axis of the helix, and gear means for coupling the turret to said motor whereby said turret and said drum rotate in synchronism so that selected elements of the copy are successively imaged on the device.

8. Optical scanning apparatus for a subject copy comprising a copy table having a transverse slotted opening therethrough, means for feeding the copy along said table past said opening, illuminating means for sequentially projecting respective spots of light upon successive transverse elements of the copy as the elements are moved by the opening including means for moving said spots successively lengthwise of the opening, a light sensitive device responsive to variations in light intensity, an optical system for directing light rays reflected from the portion of the copy illuminated by the spots to impinge upon said light sensitive device, a drum having a helically shaped aperture enclosing said light sensitive device so that the aperture is interposed in the optical path of said light rays between the copy and the light sensitive device, means for rotating the drum about the axis of the helix, and a connection between said moving means and rotating means for synchronizing movement of both of said means so that selected elements of the copy are successively imaged on the device.

9. Optical scanning apparatus for a subject copy comprising a copy table having a transverse slotted opening therethrough, one or more feed rolls positioned adjacent the opening, means for driving said feed rolls to move successive transverse elements of the copy past the opening, illuminating means for sequentially projecting respective spots of light upon the successive transverse elements of the copy as the elements are moved by the aperture including means for moving said spots successively lengthwise of the opening, a light sensitive device responsive to variations in light intensity, an optical system for directing light rays reflected from the portion of the copy illuminated by the spot to impinge upon said light sensitive device, a drum having a helically shaped aperture enclosing said light sensitive device so that the aperture is interposed in the optical path of said light rays between the copy and the light sensitive device, means for rotating the drum about the axis of the helix, and a connection between said moving means and rotating means for synchronizing movement of both of said means so that selected elements of the copy are successively imaged on the device.

10. Optical scanning apparatus for a subject copy comprising a copy table having a transverse slotted opening therethrough, one or more feed rolls positioned adjacent the opening means for driving said feed rolls to move successive transverse elements of the copy past the opening, a rotatable turret having a plurality of equally spaced, radially disposed converging lens systems, a light source positioned within said turret so that its rays are projected by the lens system as a plurality of spots of light, moving means including a motor and gear means for rotating the turret about an axis normal to the axes of the lens systems sequentially to move the spots lengthwise of the opening so that the respective spots of light are projected sequentially upon successive transverse elements of the copy as it is moved by the opening; a light sensitive device responsive to variations in light intensity, an optical system for directing light rays reflected from the portion of the copy illuminated by the spots to impinge upon said light sensitive device, a drum having a helically shaped aperture enclosing said light sensitive device so that the aperture is interposed in the optical path of said light rays between the copy and the light sensitive device, and a connection between said motor and said drum whereby the turret and the drum rotate in synchronism so that selected elements of the copy are successively imaged on the device.

11. Optical scanning apparatus for a subject copy comprising a copy table having a transverse slotted opening therethrough, means for feeding the copy along said table past said opening, illuminating means for sequentially projecting respective spots of light upon successive transverse elements of the copy as the elements are moved by the opening including means for moving said light spot successively lengthwise of the opening, a cylindrical lens interposed between said illuminating means and said opening to define the width of the spots, a light sensitive device responsive to variations in light intensity, an optical system for directing light rays reflected from the portion of the copy illuminated by the spots to impinge upon said light sensitive device, a drum having a helically shaped aperture enclosing said light sensitive device so that the aperture is interposed in the optical path of said light rays between the copy and the light sensitive device so as to define the length of the spots, means for rotating the drum about the axis of the helix, and a connection between said moving means and said rotating means for synchronizing movement of both of said means so that selected elements of the copy are successively imaged on the device.

12. Optical scanning apparatus for a subject copy comprising a copy table having a transverse slotted opening therethrough, one or more feed rolls positioned adjacent the opening, means for driving said feed rolls to move successive transverse elements of the copy past the opening, illuminating means for sequentially projecting respective spots of light upon the successive transverse elements of the copy as the elements are moved by the aperture including means for moving said spots successively, a cylindrical lens suspended beneath the table where it is interposed between the illuminating means and said opening to define the width of the spots, a light sensitive device responsive to variations in light intensity, an optical system for directing light rays reflected from the portion of the copy illuminated by the spot to impinge upon light sensitive device, a drum having a helically shaped aperture enclosing said light sensitive device so that the aperture is interposed in the optical path of said light rays between the copy and the light sensitive device, means for rotating the drum about the axis of the helix, and a connection between said moving means and rotating means for synchronizing movement of both of said means so that selected elements of the copy are successively imaged on the device.

13. Optical scanning apparatus for a subject copy comprising a copy table having a transverse slotted opening therethrough, one or more feed rolls positioned adjacent the opening, means for driving said feed rolls to move successive transverse elements of the copy past the opening, a rotatable turret having a plurality of equally spaced, radially disposed converging lens systems, a light source positioned within said turret so that its rays are projected by the lens systems as a plurality of spots of light, moving means including a motor and gear means for rotating the turret about an axis normal to the axes of the lens systems sequentially to move the spots lengthwise of the opening, a cylindrical lens suspended beneath the table where it is interposed between the illuminating means and said opening to define the width of the spots, so that the respective spots of light are projected sequentially upon successive transverse elements of the copy as it is moved by the opening, a light sensitive device responsive to variations in light intensity, an optical system for directing light rays reflected from the portion of the copy illuminated by the spots to impinge upon said light sensitive device, a drum having a helically shaped aperture enclosing said light sensitive device so that the aperture is interposed in the optical path of said light rays between the copy and the light sensitive device, and a connection between said motor and said drum whereby the turret and the drum rotate in synchronism to define the length of the spots so that selected elements of the copy are successively imaged on the device.

14. Apparatus for scanning successive, two-dimensional, elemental areas of subject copy, comprising means moving a light spot across the copy, light transmitting means effectively movable across said copy, the last said means limiting the light reflected from one dimension of said spot, thereby to define said one dimension of said elemental area and a connection between said moving means and light transmitting means for synchronizing movement of both of said means, whereby one dimension of said elemental area is defined by light on said copy and the other is defined by limiting light reflected from the copy.

15. Apparatus for scanning successive, two-dimensional, elemental areas of subject copy, comprising means illuminating a spot of said copy including means moving the spot across the copy, means limiting one dimension of said spot to one dimension of an elemental area, light transmitting means effectively movable transversely of said copy, the last said means limiting light reflected from the other dimension of said spot thereby to define the other dimension of said elemental area, and a connection between said moving means and light transmitting means for synchronizing movement of both of said means, whereby one dimension of said elemental area is defined by light on said copy and the other is defined by limiting light reflected from the copy.

16. Apparatus for scanning successive, two-dimensional, elemental areas of subject copy, comprising means illuminating a spot of said copy including means moving the spot across the copy, means limiting one dimension of said spot to one dimension of an elemental area, helical light transmitting means effectively movable transversely of said copy, said helical means limiting light reflected from the other dimension of said spot, thereby to define said other dimension of said elemental area, and means synchronizing said moving means and helical means, so that said spot need extend only partially across the copy.

17. Apparatus for scanning successive, two-dimensional, elemental areas of subject copy, comprising means illuminating a spot of said copy including rotating means moving the spot across the copy, means limiting one dimension of said spot to one dimension of an elemental area and a rotating member having a helical aperture effectively movable transversely of said copy, said aperture limiting light reflected from the other dimension of said spot to the other dimension of said elemental area, and mechanism driving said rotating means and member in synchronism.

18. Apparatus for scanning successive, two-dimensional, elemental areas of subject copy, comprising means, including a single filament illuminating an elongate spot of said copy and including means moving the spot lengthwise across the copy, means limiting the short dimension of said spot to the width of an elemental area, and light transmitting means effectively movable transversely of said copy, the last said means limiting light reflected from the elongate dimension of said spot to the other dimension of said elemental area, and a connection between said moving means and light transmitting means for synchronizing movement of both of said means, whereby one dimension of said elemental area is defined by light on said copy and the other is defined by limiting light reflected from the copy.

19. The method of scanning successive, two-dimensional, elemental areas of subject copy, comprising projecting a light spot on the copy, moving said spot across the copy, limiting one dimension of said spot to one dimension of an elemental area during projection, scanning successive areas of said copy in synchronism with said moving spot and simultaneously limiting light reflected from said spot so as to define the other dimension of said elemental area.

References Cited in the file of this patent

UNITED STATES PATENTS

| | | |
|---|---|---|
| 1,854,014 | Ballentine | Apr. 12, 1932 |
| 1,859,828 | Jenkins | May 24, 1932 |
| 1,862,455 | Barnecut | June 7, 1932 |
| 2,379,438 | Hogan | July 3, 1945 |
| 2,413,400 | Young | Dec. 31, 1946 |
| 2,510,200 | Thompson | June 6, 1950 |
| 2,569,648 | Artzt et al. | Oct. 2, 1951 |
| 2,578,307 | Hunt | Dec. 11, 1951 |

FOREIGN PATENTS

| | | |
|---|---|---|
| 562,193 | Germany | Nov. 5, 1932 |
| 855,422 | France | Feb. 12, 1940 |